United States Patent [19]
Dakovski et al.

[11] 4,362,926
[45] Dec. 7, 1982

[54] BUS-REGISTER DEVICE FOR INFORMATION PROCESSING

[75] Inventors: Lyudmil G. Dakovski; Nikola K. Kassabov, both of Sofia, Bulgaria

[73] Assignee: V M E I "Lenin", Sofia, Bulgaria

[21] Appl. No.: 86,428

[22] Filed: Oct. 19, 1979

[30] Foreign Application Priority Data

Nov. 8, 1978 [BG] Bulgaria .................................. 41322

[51] Int. Cl.³ ............................................ G06M 3/08
[52] U.S. Cl. ............................................. 235/92 CC
[58] Field of Search ......... 235/92 CC, 92 SH, 92 PB, 235/92 NG, 92 MB; 328/37, 42

[56] References Cited

U.S. PATENT DOCUMENTS

3,511,977  5/1970  Hornung ..................... 235/92 CC
3,548,167 12/1970  Emde ........................... 235/92 CC Primary Examiner—Joseph M. Thesz
Attorney, Agent, or Firm—Karl F. Ross

[57] ABSTRACT

A register circuit for processing information in accordance with a given instruction set or set of transformation comprises N registers each having an input and an output and provided in a sequence $R_1, R_2, R_3, \ldots R_N$, each register having n digits where N and n are integers. The output of the first register $R_1$ is connected to a first bus while its input is connected to a second bus. All of the other registers $R_2, R_3, \ldots R_N$ have their inputs connected to the first bus and their outputs to the second bus by respective strobe circuits. The strobe circuits of each of the buses $R_3 \ldots R_N$ are connected to respective control inputs $a_3 \ldots a_N$. Additional control inputs $a_1$ and $a_2$ are connected to an OR-gate whose output is applied to the input strobe circuit of register $R_2$ while the input $a_2$ is also applied directly to the output strobe circuit of register $R_2$. This allows transfer of the contents of the first register to the second upon the application of a signal to the input $a_1$ and parallel transfer between all the registers by the appropriate control inputs.

1 Claim, 1 Drawing Figure

BUS-REGISTER DEVICE FOR INFORMATION PROCESSING

This invention relates to an information processing method and bus-register device for implementation of sequential instruction sets. This method and device can be utilized in the design of processors for digital computers and discrete arithmetic and control devices in automation and computer science.

BACKGROUND OF THE INVENTION

Methods for implementation of sequential type information processing are known, which are characterized by the fact that the transition table of the instruction set is either recorded on a memory device, or on its basis an electronic circuit is synthesized, which corresponds only to the given instruction set.

A shortcoming of these methods is that it is impossible to implement a sequential type instruction set in a register structure with functionally complete links and with general applications, which is a fundamental part of a processor for a digital computers and other discrete devices and is accessible by the user or the designer of these devices.

Methods for implementation of a sequential type instruction set within a register structure are not known.

Bus-register devices are known however which have registers and a set of lines—or bus. The outputs of all registers, as well as their inputs, are connected to the buses through strobe circuits, each one of which is controlled by an independent control line. A strobe circuit (see IEEE Standard Dictionary of Electrical and Electronic terms, Second Edition, p. 686) provides pulse interaction between the register pulse and the control pulse.

A shortcoming of the existing bus-register structures is the large number of control lines—2N, where N is the number of registers. In these devices it is also impossible to implement an arbitrary parallel exchange of the register contents, while giving the control signals during one cycle it is possible to implement only transmission of the contents of one register toward another.

OBJECT OF THE INVENTION

The object of this invention is to provide a method and bus-register device for implementation of a sequential type instruction sets with functionally complete links and reduced number of bus lines and with the possibility of achieving parallel exchange of the register contents.

SUMMARY OF THE INVENTION

This problem has been resolved in a method for implementation of a sequential type instruction sets within a register structure, which consists of N n-digit registers and possesses functional completeness of the links, where for every state of the instruction set there is compared a N-digit $2^n$-bit number, where digits are contained in the number, with another state of the instruction set, which is expressed through a transition table into the first. For implementation of every transition between two states of the instruction set to the register structure a sequence of signals (control signals), the registers exchange their contents in a way that the number corresponding to the previous state of the instruction set is transformed into a number which corresponds to the next state of the instruction set, passing sequentially through the other number—states of the register structure.

An advantage of this method is that it makes possible implementation of a sequential type instruction set in a register structure, without the necessity of synthesizing specialized and complex electronic circuits, or to use a memory device to record the transition table of the instruction set.

The invention also provides a bus-register device, which consists of N n-digit registers. N and n are integers, connected in paraphase to two buses through strobe circuits, where the outputs of the registers from the second towards the last are connected to the first bus, to which are connected the inputs of the first register, while the inputs of the registers from the second to the last are connected to the second bus, to which are connected also the outputs of the first register. The control inputs of the two strobe circuits for connecting every register starting with the third to the last to the two busses are connected to the corresponding to that register control line, while the control input of the strobe circuit for connecting the inputs of the second register to the second bus is connected through an OR-gate to the first and the second control bus-line, and to the second control bus-line is connected also the control input of the strobe circuit for connecting of the outputs of the second register to the first bus. The inputs and outputs of the device are the two busses.

An advantage of the bus-register device is the reduced number of control bus lines, and also the opportunity of implementing a parallel exchange of contents between the registers and exchange of the contents of two registers within one cycle.

BRIEF DESCRIPTION OF THE DRAWING

The above and other objects, feastures and advantages of the invention will become more readily apparent from the following description reference being made to the accompanying drawing in which the sole FIGURE is a block diagram illustrating the register stack of the invention.

SPECIFIC DESCRIPTION

Figure 1:
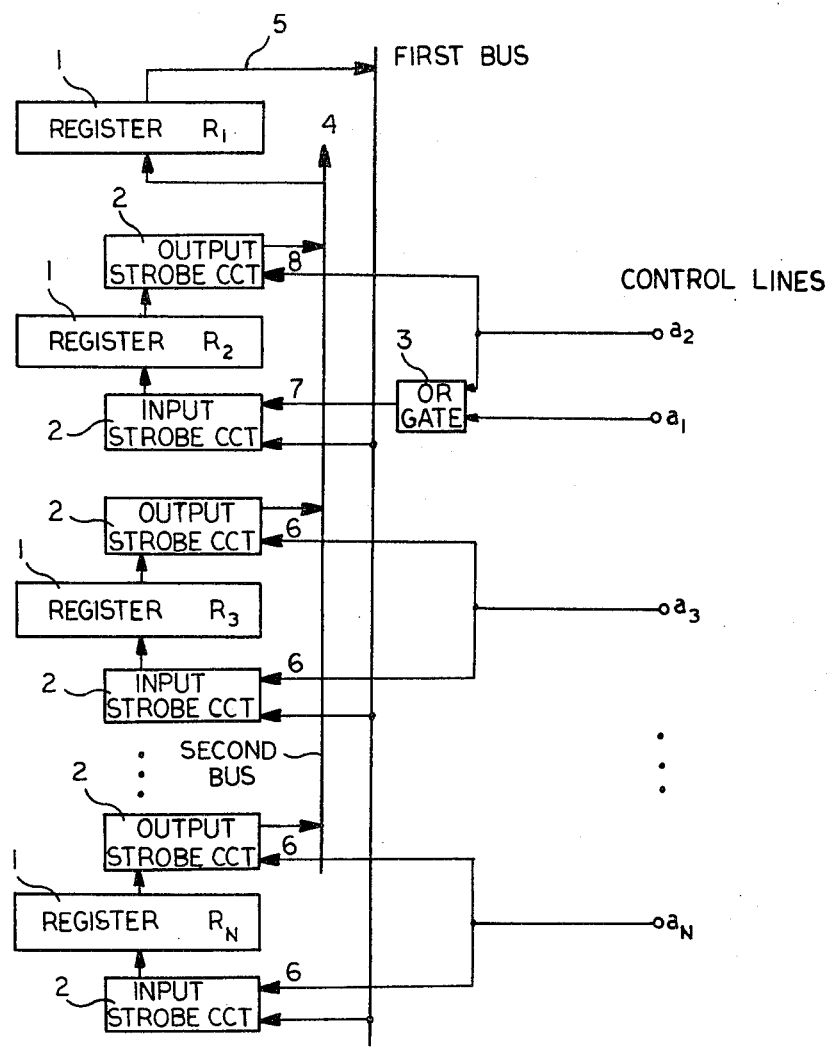

The circuit comprises N n-digit registers 1, two busses 4, 5 and strobe circuits 2 for connecting the registers 1 to the busses 4 and 5. The outputs of the registers 1 starting from the second to the last are connected to the first bus 4, to which are connected also the inputs of the first register, while the inputs of the registers 1 starting from the second to the last are connected to the second bus 5, to which are connected also the outputs of the first register. The control inputs of the strobe circuits 2 for connection of every register starting from the third to the last to the two busses 4 and 5 are connected to a control input, which corresponds to it, from $a_3$ to $a_N$ for direct control of the device, while the control input 7 of the strobe circuit for connection of the inputs of the second register to the second bus 5 is connected through an OR-gate 3 to the first control bus-line $a_1$ and to the second control bus-line $a_2$, which is connected also to the control input of the strobe circuit 2 for connecting the outputs of the second register to the first bus.

The bus-register device functions, according to the invention, as follows:

When there is a signal on the control bus line $a_i$ (i=2, 3, ..., N), registers number 1 and i exchange their contents, i.e., the register device implements the transformtion $$p_i = \begin{pmatrix} 1, 2, \ldots, i, \ldots N-1, N \\ i, 2, \ldots, 1, \ldots N-1, N \end{pmatrix},$$

where on the first row are written the numbers of the registers, which accept the contents of the corresponding register from the second row of the transformation. When there is a signal on the first control bus-line $a_1$ the content of the first register is copied into the second, i.e. implemented transformation $$p_1 = \begin{pmatrix} 1 & 2 & 3 & \ldots & N \\ 1 & 1 & 3 & \ldots & N \end{pmatrix}.$$

The transformations $p_1, p_2, \ldots, p_N$ form a basis in respect to all transformations of the elements $1, 2, \ldots, N$ and every parallel exchange between any of the N registers of the device, described by the transformation $$\phi = \begin{pmatrix} 1 & 2 & 3 & \ldots & N \\ \phi_1 \phi_2 \phi_3 & \ldots & \phi_N \end{pmatrix},$$

and could be implemented when $\phi$ is expanded in accordance to known algorithms and computer programs into a product of the basis transformations $p_1, p_2, \ldots, p_N$, while to the device is inputted a sequence of control signals, which correspond to the transformations from the expansion of $\phi$ and are taken in reverse order. Every control signal $a_i$ ($i=2, 3, \ldots, N$) activates through the control inputs 6, 7, 8 the strobe circuits 2, through which the outputs of the i-th register (from the second to the last) are connected to the first bus 4, and its inputs to the second bus 5. The control signal $a_1$ activates through input 7 the strobe circuit 2 which connects the inputs of the second register to the outputs of the first through the second bus 5.

The method for implementation of a sequential type instruction sets in a register structure is illustrated by the example for implementation of an instruction set, which is given with its transition table—Table 1 into a bus-register device, which consists of three two digit registers—$N=3$, $n=2$, according to the invention. According to the requirements of the method, in accordance to the invention, the following comparison between the states of the instruction set with the state of the device is taken, which represent three-digit numbers:

| $S_1$ | $S_2$ | $S_3$ | $S_4$ | $S_5$ | $S_6$ | $S_7$ | $S_8$ | $S_9$ |
|---|---|---|---|---|---|---|---|---|
| 112 | 013 | 102 | 103 | 211 | 001 | 210 | 003 | 110 |

Every transition of two automatic states, when the codes are determined, could be described with transformations of the contents of the registers of the device. These transformations could be expanded into a product of basic transformations $$p_1 = \begin{pmatrix} 1 & 2 & 3 \\ 1 & 1 & 3 \end{pmatrix}, p_2 = \begin{pmatrix} 1 & 2 & 3 \\ 2 & 1 & 3 \end{pmatrix} \text{ and } p_3 = \begin{pmatrix} 1 & 2 & 3 \\ 3 & 2 & 1 \end{pmatrix}$$

in accordance to known algorithms or computer programs. The transformations which correspond to every transition and their expansions are shown in Table 2. To implement every transition between two states of the automaton, according to its transition table—Table 1, to the device is given a control sequence of signals for implementation of the basis transformations, which corresponds to the expansion from Table 2 and is taken in reverse order. For example, in order to implement the transition from state $S_6$ into state $S_9$ when the input for the automaton signal $X_1$ is given, to the device is given the following sequence $a_1, a_3, a_1$, where the control signals noted as the control bus-lines on which they are given.

TABLE 1

| State Input signal | $S_1$ | $S_2$ | $S_3$ | $S_4$ | $S_5$ | $S_6$ | $S_7$ | $S_8$ | $S_9$ |
|---|---|---|---|---|---|---|---|---|---|
| $X_1$ | $S_5$ | $S_4$ | $S_1$ | $S_4$ | $S_1$ | $S_9$ | $S_9$ | $S_8$ | $S_6$ |
| $X_2$ | $S_5$ | $S_8$ | $S_7$ | $S_8$ | $S_5$ | $S_9$ | $S_3$ | — | $S_9$ |

TABLE 2

| | $S_1$ | $S_2$ | $S_3$ | $S_4$ | $S_5$ | $S_6$ | $S_7$ | $S_8$ | $S_9$ |
|---|---|---|---|---|---|---|---|---|---|
| $X_1$ | $\begin{pmatrix}123\\321\end{pmatrix}=$ | $\begin{pmatrix}123\\213\end{pmatrix}=$ | $\begin{pmatrix}123\\113\end{pmatrix}=$ | $\begin{pmatrix}123\\123\end{pmatrix}$ | $\begin{pmatrix}123\\321\end{pmatrix}=$ | $\begin{pmatrix}123\\331\end{pmatrix}=$ | $\begin{pmatrix}123\\223\end{pmatrix}=$ | $\begin{pmatrix}123\\123\end{pmatrix}$ | $\begin{pmatrix}123\\331\end{pmatrix}=$ |
| | $=P_3$ | $=P_2$ | $=P_1$ | — | $=P_3$ | $=P_1 \cdot P_3 \cdot P_1$ | $=P_1 \cdot P_2$ | — | $=P_1 \cdot P_3 \cdot P_1$ |
| $X_2$ | $\begin{pmatrix}123\\321\end{pmatrix}=$ | $\begin{pmatrix}123\\113\end{pmatrix}=$ | $\begin{pmatrix}123\\231\end{pmatrix}=$ | $\begin{pmatrix}123\\223\end{pmatrix}=$ | $\begin{pmatrix}123\\123\end{pmatrix}=$ | $\begin{pmatrix}123\\331\end{pmatrix}=$ | $\begin{pmatrix}123\\312\end{pmatrix}=$ | — | $\begin{pmatrix}123\\123\end{pmatrix}$ |
| | $=P_3$ | $=P_1$ | $=P_2 \cdot P_3$ | $=P_1 \cdot P_2$ | — | $=P_1 \cdot P_3 \cdot P_1$ | $=P_3 \cdot P_2$ | — | — |

What we claim is:

1. An information processing device comprising:
N, n-digit registers in a sequence $R_1, R_2, R_3, \ldots R_N$, each of said registers having an input and an output;
a respective input strobe circuit connected to the input of each register of said sequence from the second register $R_2$ to the last register $R_N$ thereof, and a respective output strobe circuit connected to the output of each register of said sequence from the second register $R_2$ to the last register $R_N$ thereof;
a first information bus connected directly to the output of said first register $R_1$ and to each of the input strobe circuits, and a second information bus connected directly to the input of said first register $R_1$ of the sequence and to each of said output strobe circuits, each of said input strobe circuits transferring information signals to the respective register $R_2 \ldots R_N$ from said first bus and each of said output strobe circuits transferring information signals from the respective registers $R_2 \ldots R_N$ to said second bus upon the application of a control signal to a respective control input of the respective strobe circuit;

respective first control lines to each of said registers of said sequence from the third register $R_3$ to the last register $R_N$ of said sequence, each of said first control lines being connected to the control inputs of both the input and output strobe circuits of the respective register $R_3 \ldots R_N$ for direct control of transfer of information to and from the registers $R_3 \ldots R_N$;

a second control line connected directly to the control input of the output strobe circuit of the second register $R_2$;

an OR-gate having its output connected to the control input of the input strobe circuit of the second register $R_2$ and a first input connected to said second control line; and a third control line connected to a second input of said OR-gate whereby a signal applied to said third control line transfers the contents of said first register $R_1$ to said second register $R_2$ through said buses and signals applied to the respective lines effect parallel transfer of information between said registers.

* * * * *